United States Patent Office 3,342,889
Patented Sept. 19, 1967

3,342,889
AROMATIZING HYDROCARBONS
Paul S. Hudson, Bartlesville, Okla., assignor to Phillips Petroleum Company, a corporation of Delaware
No Drawing. Filed Sept. 21, 1964, Ser. No. 398,094
4 Claims. (Cl. 260—673.5)

ABSTRACT OF THE DISCLOSURE

Aromatic products such as benzene, toluene and the like are produced from acyclic hydrocarbons containing 6 to 16 carbon atoms by contacting the acyclic hydrocarbons with a copper halide at a temperature in the range of 500° to 1050° F. in the presence of a hydrogen halide and oxygen.

---

This invention relates to the preparation of aromatic compounds. In one of its aspects it relates to the conversion of acyclic hydrocarbons to aromatic compounds. In another aspect it relates to a novel catalyst system for the conversion of acyclic hydrocarbons to aromatic compounds.

Aromatic compounds such as benzene, toluene, xylene and the like are highly valuable and basic compounds for many purposes in the chemical industry, as well as other industries. The high demand for aromatic compounds requires the continued development of better and different methods for the production of such basic compounds.

It is the object of the present invention to provide a new method for the preparation of aromatic compounds from acyclic hydrocarbons.

Other objects, aspects and advantages of the invention will be readily apparent to those skilled in the art from the description and the appended claims.

In accordance with the present invention I have discovered that aromatic products such as benzene, toluene, xylenes and the like can be prepared from acyclic hydrocarbons having 6 to 16 carbon atoms per molecule. The conversion of the hydrocarbons is achieved by contacting the acyclic hydrocarbons with a copper halide at a temperature in the range of 500° to 1050° F. in the presence of a hydrogen halide and oxygen.

The hydrocarbons which are applicable as feed material for the present invention are saturated acyclic hydrocarbons having from about 6 to 16 carbon atoms per molecule. Unbranched acyclic hydrocarbons are preferred. By the process of this invention these feed materials are converted to aromatic products such as benzene, toluene, xylenes, and other types of substituted aromatic materials. In some cases the number of carbon atoms in the product molecule will be less than that in the feed material.

The solid catalyst utilized in the present invention is a copper halide such as copper chloride ($CuCl_2$) which is supported on a conventional high surface area catalyst carrier. Such carriers include silica, alumina, silica-alumina, charcoal, pumice, and the like. The amount of copper chloride on the carrier can vary widely but will generally be in the range from about 1 to about 50 weight percent of the total solid catalyst composite. If desired, minor quantities of other metallic chlorides such as iron chloride, manganese chloride, rare earth metal chloride, and the like can be included in the catalyst composite.

The solid catalyst can be prepared by any conventional process such as by impregnation of the chosen carrier with an aqueous solution of the copper halide. Prior to use in the process the solid catalyst composite is dried at temperatures which can range from about 200° F. to about 1200° F. When the higher temperatures are used, the drying should be conducted to avoid significant loss or decomposition of the copper compound. The presence of hydrogen halide during the drying can be used to minimize or prevent the conversion of the copper halide to the oxide.

The aromatization process can be carried out by any conventional contacting technique such as by fixed bed operation, fluidized catalyst chamber operation, and the like. The process is carried out in the vapor phase at temperatures from about 500° to about 1050° F., preferably 800° to 1000° F., and at pressures of 0 to 1000 p.s.i.g., preferably 0 to 300 p.s.i.g. The proportion of oxygen and hydrocarbon will be such that the volume of oxygen used will be from about 1 percent to about 40 percent of the volume of gaseous hydrocarbon feed. Air can be used as a convenient source of the oxygen. The amount of hydrogen halide used can vary widely and the ratio of HCl to $O_2$ will be in the range of 90:10 to 10:90 by volume. The gaseous hourly space velocity of the total gaseous charge passing through the catalytic zone will be in the range from about 10 to about 1000 volumes of gas per volume of catalyst per hour.

After contacting the catalyst bed at the above conditions, the gaseous effluent is separated into components and the product recovered by conventional means such as fractionation, solvent extraction, adsorption and the like. Unconverted feed materials, diluents and hydrogen halide can be recycled.

The invention is further illustrated by the following example.

Example

Normal octane was converted to aromatic products in a fixed bed reactor containing copper chloride on a silica gel carrier.

A solid catalyst was prepared by slurrying 36 grams of 10–20 mesh silica gel with a 100 ml. aqueous solution containing 50 grams copper chloride ($CuCl_2$) and 1 gram thorium chloride ($ThCl_4$). After two hours the slurry was drained and the impregnated silica gel was dried at 140° C.

The catalyst was then charged into a tubular stainless steel reactor which was about ¾ inch in diameter and which contained a ¼ inch thermowell within. The catalytic zone measured 18 inches in length.

With the catalytic tube maintained at 920° F. a vaporized stream of normal octane was admitted into the reactor at a space rate of 56 v./v./hr. together with a stream of hydrogen chloride and air (having a HCl/oxygen molar ratio of 4 to 1) at a space velocity of 53 v./v./hr.

The conversion was carried out at atmospheric pressure.
Analysis of the effluent showed, in weight percent, the following distribution:

| | |
|---|---|
| n-Octane | 93.5 |
| Toluene | 0.2 |
| Ethylbenzene | 0.5 |
| m- and p-Xylene | 4.2 |
| o-Xylene | 1.6 |

The data in the above table indicate that the inventive process is capable of converting normal octane to aromatic products.

Reasonable variations and modifications of this invention can be made, or followed, in view of the foregoing without departing from the spirit or scope thereof.

I claim:
1. A process for aromatizing acyclic hydrocarbons containing 6 to 16 carbon atoms per molecule which comprises contacting said hydrocarbons with a copper halide in the presence of hydrogen chloride and oxygen at a temperature in the range of 500° to 1050° F.

2. The process of claim 1 wherein said hydrocarbon is n-octane.

3. A process according to claim 1 wherein said copper halide has therein a metal halide selected from the group consisting of iron chloride, manganese chloride, rare earth metal chloride and thorium chloride.

4. A process according to claim 1 wherein said copper halide is copper chloride.

References Cited
UNITED STATES PATENTS

| | | | |
|---|---|---|---|
| 2,396,697 | 3/1946 | Gorin | 260—673 |
| 3,080,435 | 3/1963 | Nager | 260—673.5 |
| 3,217,064 | 11/1965 | McGreevy et al. | 260—683.3 |

DELBERT E. GANTZ, *Primary Examiner.*

J. D. MYERS, *Assistant Examiner.*